United States Patent [19]

Mifsud

[11] Patent Number: 4,483,411
[45] Date of Patent: Nov. 20, 1984

[54] TUNABLE MARINE SEISMIC SOURCE

[75] Inventor: Joseph F. Mifsud, Houston, Tex.

[73] Assignee: Exxon Production Research Co., Houston, Tex.

[21] Appl. No.: 235,202

[22] Filed: Feb. 17, 1981

[51] Int. Cl.³ .............................................. G01V 1/38
[52] U.S. Cl. .................................. 181/120; 181/161; 181/402; 367/23; 367/143; 367/152
[58] Field of Search ............... 181/110, 120, 106, 161, 181/401, 402, 119, 121; 367/17, 18, 189, 190, 143, 152, 167, 189, 190, 23

[56] References Cited

U.S. PATENT DOCUMENTS

| 3,392,369 | 7/1968 | Dickie et al. | 367/143 |
| 3,578,102 | 5/1971 | Ross et al. | 367/190 X |
| 3,718,205 | 2/1973 | Fair et al. | 181/106 X |
| 4,014,403 | 3/1977 | Mifsud | 367/190 |

OTHER PUBLICATIONS

"Resonance Plans for Adjusting the Power Chamber of the Vibrator to the Ground", Institute of Geology and Geophysics of the Siberian Branch of the AS USSR, Novosibirsk, Nov. 10, 1977, pp. 68–74.

Primary Examiner—Maynard R. Wilbur
Assistant Examiner—K. R. Kaiser
Attorney, Agent, or Firm—E. Thomas Wheelock; Alfred A. Equitz

[57] ABSTRACT

The disclosed device is a marine seismic source which produces a varying FM signal in the low end of the acoustic spectrum. The seismic source uses stiff oscillating radiators to create a signal in the water. These radiators are attached to devices acting as springs with a variable spring rate. Variation of the spring rate as a function of the frequency permits the device to be tuned for maximum power output.

14 Claims, 9 Drawing Figures

TUNABLE MARINE SEISMIC SOURCE

BACKGROUND OF THE INVENTION

1. Object of the Invention

This invention relates to a tunable seismic energy source used to generate seismic signals in searching for petroleum beneath a water body. In particular, it relates to apparatus suitable for continuously tuning the output mechanical impedance of a seismic source so that a high percentage of the energy applied to the source transducer is converted to acoustic energy. The seismic source desirably is of the type producing a frequency modulated acoustic wave that sweeps the acoustic spectrum between about 10 and 100 Hz.

2. Field of the Invention

The ever more difficult search for petroleum has led to exploration in areas which were thought by many just a short time ago to be incapable of producing petroleum at an economically feasible price. The rising price of petroleum coupled with its relative domestic scarcity has made acceptable the costs associated with production in Alaska and the North Sea, as well as in a number of offshore areas.

Of the many methods used in prospecting for subsea petroleum, few have attained as widespread an acceptance as has the use of towable marine seismic sources.

The theory of operation in using marine acoustic sources to search for petroleum is quite simple. An acoustic signal is introduced into the water body. The acoustic wave propagates down through the water, across the water-floor interface, and into subfloor geologic formations. The resultant echoes are, to some extent, reflected back across the same path to an array of hydrophones waiting near the water's surface. Analysis of the signals produced by the hydrophones can provide some instruction concerning the structure of the subfloor geological formations and attendant petroleum accumulation in those formations.

The term "water" as used herein is meant to include swampwater, mud, marshwater, seawater or any other liquid containing sufficient water to enable operation of the invention.

There are many different methods of producing an acoustic pulse. For instance, the earliest attempts entailed the use of solid explosives. This method produces a strong acoustic wave which, accordingly, achieves substantial penetration into subfloor geologic iormations and a strong return echo. However, solid explosives possess certain inherent drawbacks: they are dangerous to store, handle, and use. When set off in open water, they kill marine life. In a crowded area such as a harbor, they cannot be used at all. Solid explosives are orders of magnitude more expensive to use, on a per-shot basis, than are most other acoustic sources. Modification of the acoustic signature to achieve an acceptable frequency spectrum distribution is most difficult.

Apparatus using explosive gas mixtures, e.g., propane and oxygen, to produce an acoustic signal in the form of a pulse or shock wave have gained wide acceptance. The two major types of explosive gas guns are: first, those which operate by exploding a gas mixture behind a flexible membrane which is in contact with the water; and, second, those which operate by allowing the abrupt bubble from the gas explosion to pass directly into the water. An example of the former apparatus can be found in U.S. Pat. No. 3,658,149; an example of the latter apparatus can be found in U.S. Pat. No. 4,193,472.

Other devices using high pressure compressed gases to generate an acoustic pulse have also gained wide acceptance in the industry. These apparatus, or guns, typically employ a gas-holding chamber which is pressurized to attain some pre-set level and is fired by allowing the pressurized gas to explosively exit the gun into the surrounding water. Examples of open-ported pressurized gas guns are found in U.S. Pat. No. 3,653,460, to Chelminski, and U.S. Pat. No. 4,141,431, to Baird.

The device of the present invention is a member of a class which generates a relatively low-power and low-frequency (10-100 Hz) acoustic signal known as a "chirp" which extends over a period of seconds. The transmitted signals are desirably low-frequency to reduce attenuation losses in the reflected waves. Unlike the previously mentioned devices which emit a short duration pulse and thereby provide a discrete echo at some readily determinable point in time, the chirp devices often vary the frequency of the transmitted signal in some pre-set manner so that a unique frequency in the reflected signal can be correlated as a function of time with that same frequency in the transmitted signal. A collection of received signals or "trace" can be mathematically manipulated to produce a subterranean map.

The transducer in subsea vibrator devices typically is an acoustic piston or plate in contact with the water and driven by a pneumatic or hydraulic actuator modulated at the desired frequency. An example of such a device is found in U.S. Pat. No. 4,211,301, to Mifsud. The patent does not discuss methods of continuously tuning the source for maximum output.

There is a limit to the amount of energy that can be introduced into a subsea acoustic wave. That amount depends on, inter alia, the size of the transducer, the amplitude of oscillation, the depth of source placement, temperature and salinity of the water, and the frequency of the transmission. When this threshhold amount of induced energy is exceeded, the source cavitates and produces gas bubbles rather than a clean acoustic signal. Nevertheless, the strength of the acoustic signal should be maximized to assure the strongest possible echo. The invention disclosed herein deals with apparatus suitable for maximizing the efficiency of such a marine seismic source by adjusting its output acoustic impedance so that a higher percentage of the input power is used to radiate acoustic energy.

Other marine seismic sources are known which provide for preventing cavitation. The disclosure in U.S. Pat. No. 3,691,516, to Graham et al, provides a description of an apparatus having a pair of acoustic pistons located at opposite ends of the device. The acoustic pistons are held outward from the center of the seismic source by a pair of variable volume chambers. The pressure within the variable volume chambers is repetitively varied downward and then returned to the initial value. This sharp reduction in pressure causes the pistons to move inward initiating the pulse. Hydraulic cylinders attached to the pistons via piston rods then tend to restore the pistons to their original extended positions. The acceleration rate of the pistons is controlled using a feedback loop so that the pistons produce the maximum possible acoustic output power as limited by the cavitation threshold. The acceleration rate is varied by pressure control of the fluid introduced into the aforementioned hydraulic cylinders. The frequency of the device is changed by a fulcrum and beam arrangement operating in conjunction with the piston-restoring hydraulic cylinders.

The Graham device produces a pulse which has the maximum power attainable for the physical size of the acoustic pistons in their particular surrounding fluid. The device desirably operates just below the cavitation threshold. The device does not vary its output impedance to maximize output at a particular available power input using the apparatus of the instant invention.

Other marine seismic sources which suggest tuning the source for maximum output are typified by: U.S. Pat. No. 3,349,367, to Wisotsky; U.S. Pat. No. 3,392,369, to Dickie et al; U.S. Pat. No. 4,030,063, to Wallen; and U.S. Pat. No. 4,142,171, Pickens. Each of these patents is a single frequency source.

SUMMARY OF THE INVENTION

The inventive marine seismic source has two acoustic radiating plates, mounted at opposite ends of a supporting frame, which are driven by a balanced double-ended, push-pull hydraulic drive cylinder. The source produces a frequency modulated acoustic signal which is linearly swept through a low frequency acoustic spectrum by modulation of the hydraulic fluid pressure introduced into the drive cylinder. The mechanical impedance of the radiating plates is continuously varied with the sweeping frequency by an oleo-pneumatic or hydraulic spring. Adjustment of the effective spring rate of the spring effectively optimizes the efficiency of the device by tuning the instantaneous output impedance of the radiating plates to one consisting mainly of radiation resistance for the instantaneous frequency.

DESCRIPTION OF THE PREFERRED EMBODIMENTS

Figure 1:
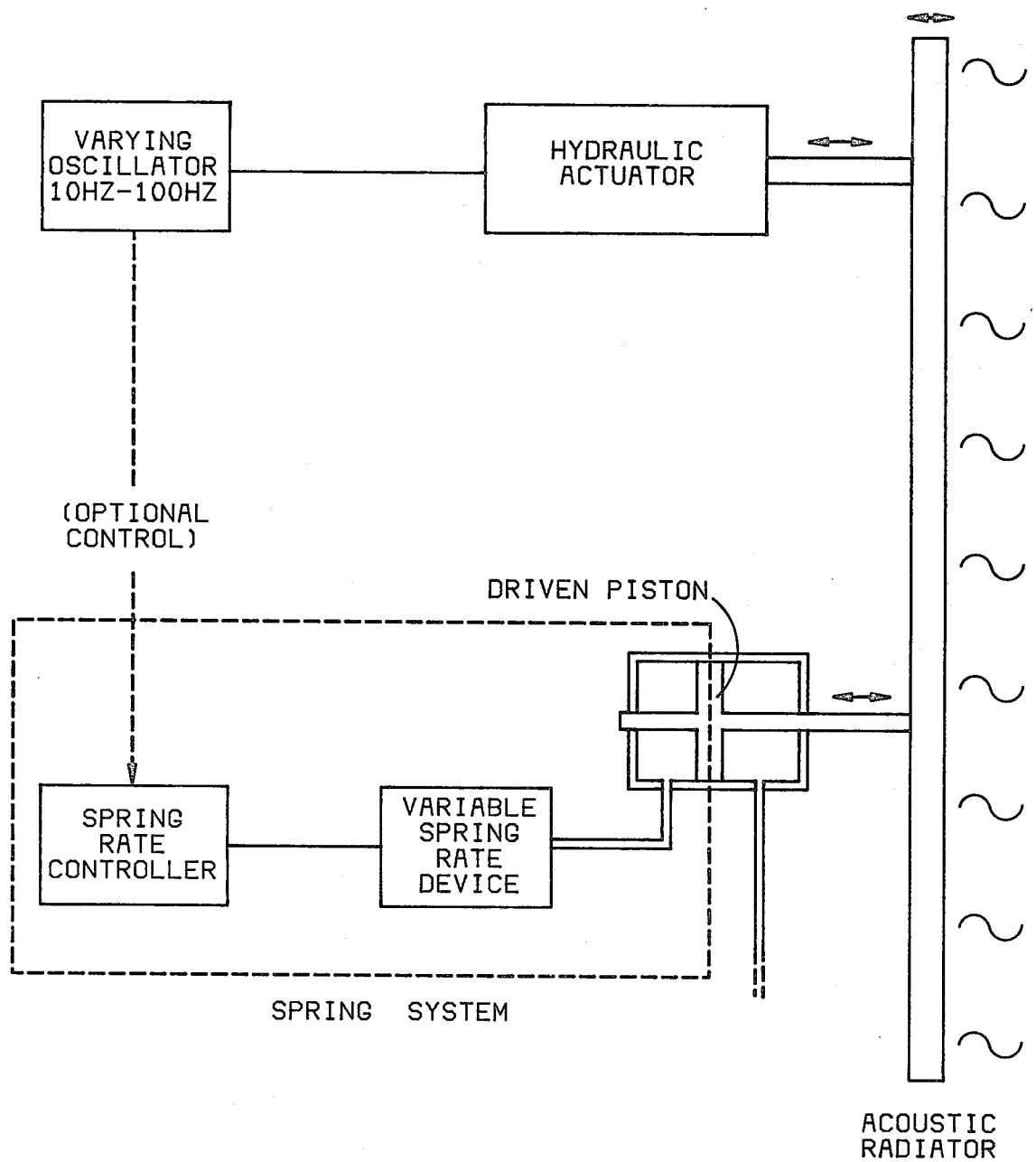
FIG. 1 is a block diagram of the invention.

The disclosed apparatus is conventional in some respects. In the preferred embodiment, the device emits a constantly varying FM signal which sweeps the low frequency spectrum included in the frequency range between about 10 Hz and about 100 Hz. The acoustic source, as shown in the block diagram of FIG. 1, uses a fairly stiff acoustic radiator moving via a connection with a hydraulic actuator oscillating at the desired frequency. The invention, however, is unconventional in other respects. The acoustic radiator is also attached to one or more spring assemblies having a variable spring rate. The spring rate is varied as a function of frequency to continuously tune the acoustic output impedance of the transducers and, ideally, maximize the effective output power of the source.

The term "spring rate", as used throughout this specification, is meant to be synonymous with the terms "spring constant" or "force constant". The terms describe only the change in force with respect to distance, i.e., dF/dx. This invention, as discussed elsewhere, relates to varying the spring rate as a function of frequency and, since the frequency of this genus of seismic sources often vary as a function of time, as a function of time.

The variable spring system is made up of three parts: a driven piston physically connected to the acoustic radiating plate, a variable spring rate device which varies overall spring rate of the output load of the system, and a spring rate controller which controls the spring rate directly or indirectly as a function of the drive frequency.

The variable spring system is used to achieve increased efficiency in marine seismic sources by adjusting the output acoustic impedance of the source transducer so that an increased amount of the input power is found in the output as acoustic energy. The transducers, or acoustic radiators as herein described, are continuously tuned as a function of the slowly varying FM acoustic output signal. The output impedance ($Z_r$) of an acoustic source is the sum of two components: a resistive load (R) and a reactive load ($\omega M$; where $\omega$ is the radian frequency of vibration and M is the mass of the acoustic radiator plus the mass of fluid moving with the acoustic radiator).

$$Z_r = R + i\omega M$$

A spring will have the impedance:

$$Z_s = -iK/\omega$$

where K is the spring constant.

A spring may be sized and thereafter attached to the acoustic radiator to cancel the inertial loading due to the mass of the acoustic radiator and the fluid moving with the radiator. The force constant (K) of the spring is to be continuously changed as a function of the frequency of the source such that:

$$K = \omega^2 M$$

Each of the spring systems attached to a radiating plate operates to vary its overall spring constant in a fairly straight-forward manner. A double-acting piston is connected to, and moves with, its acoustic radiator. The piston, so-driven, is in contact with two separate liquid volumes within its cylinder. Each of these liquid volumes is, in turn, in communication with an auxiliary device which varies either the overall volume of the spring system (if the system is filled only with a liquid) or the pressure and/or volume of the spring system (if the system contains both a liquid and a gas). Variation of volume and/or pressure allows the spring constant of a system to change and therefore modify the output impedance at its acoustic radiator.

Figure 2:
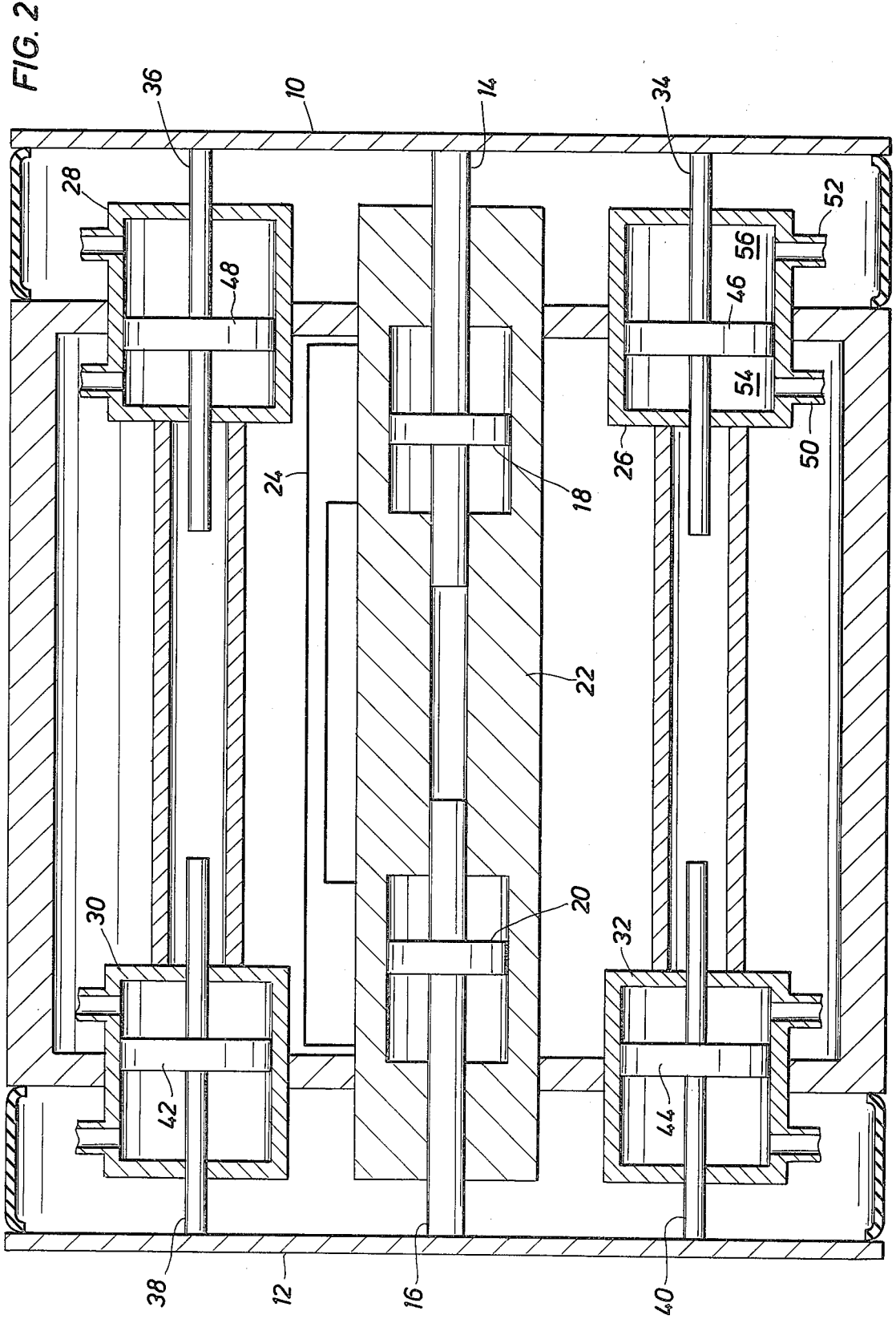
FIG. 2 schematically depicts, in cross-section, a seismic source built according to the invention.

In FIG. 2, acoustic radiating plates 10 and 12 are mechanically actuated to produce a signal through rods 14 and 16, by hydraulic actuating pistons 18 and 20. Actuating pistons 18 and 20 are double-acting and are reciprocated in hydraulic drive cylinder 22 under modulation from servo valve 24. The embodiment shown in FIG. 2 uses four oil-filled driven spring cylinders 26, 28, 30, and 32 which, through spring rods 34, 36, 38, and 40 and pistons 42, 44, 46, and 48, form one portion of a double-acting spring system.

Each of the spring cylinders 26, 28, 30 and 32 illustrated in FIG. 2 is double-acting. For instance, spring cylinder 26 has two ports 50 and 52 each leading to spring cylinder volumes 54 and 56 disposed on opposite sides of piston 46. In the configuration shown in FIG. 2, each of the remaining spring cylinders 28, 30, and 32 has a set of components similar to that of cylinder 26. However, for the sake of simplicity, only spring cylinder 26 will be discussed in detail.

Each of volumes 54 and 56 is connected to another device which provides a variable spring rate.

Figure 3:
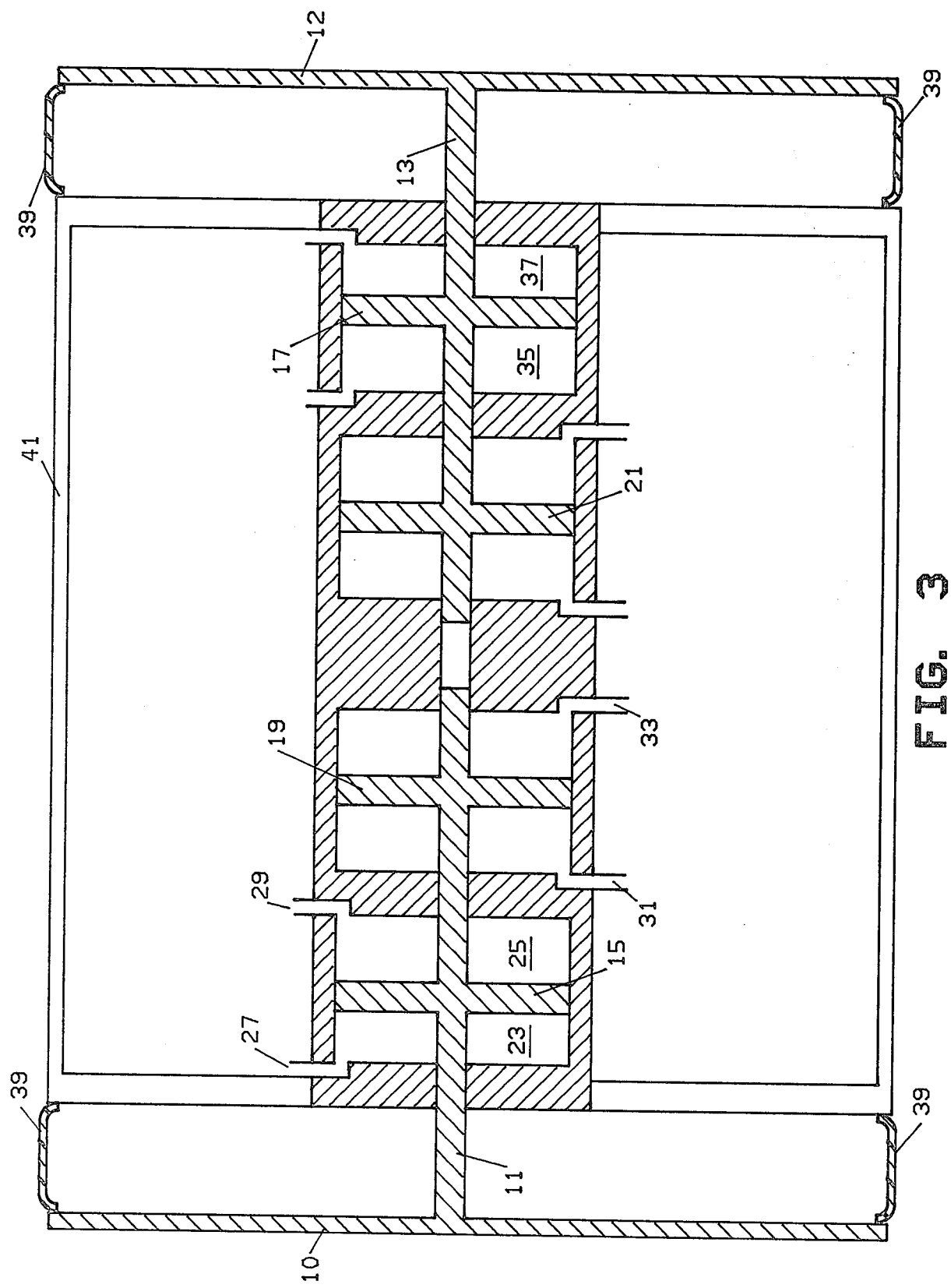
FIG. 3 shows, in cross-section, a second embodiment of the inventive seismic source.

The flexibility of this invention is best illustrated by the many different configurations the novel seismic source may take. FIG. 3 provides a variation of the invention in which the driven spring piston and the actuating pistons share common shafts connected to the radiating plates.

As with the device shown in FIG. 2, this configuration has opposed acoustic radiating plates 10 and 12. Since the plates are intended to operate 180° out of phase, i.e., when one plate moves in one direction away from the center of the device the other plate moves in the opposite direction, the forces imposed on the supporting framework are balanced thereby negating the need for a large frame.

The radiating plates 10, 12 are attached via connecting rods 11, 13 to the driven spring pistons 15, 17 and the actuating pistons 19, 21. The actuating pistons and the driven spring pistons are double-acting and operate in precisely the same manner as do those same components in FIG. 2. For instance, driven spring piston 15 has two spring volumes 23, 25 on its opposite sides. Each of spring volumes 23, 25 is attached via ports 27, 29 to one of the variable spring rate components described below. Actuating piston 19 is similarly double-acting and, like the actuating pistons in the FIG. 2 variation, can be modulated by a servo valve alternately pulsing ports 31 and 33 at the desired frequency. Actuating piston 21 operates in the same way and, as mentioned above, is 180° out of phase with actuating piston 19. Although the spring pistons are shown in FIG. 3 to be the same diameter as the actuating pistons, such is not normally the case.

It is again noted that spring volumes that are simultaneously in compression may be tied to a single variable spring rate device. In each of the disclosed seismic sources, the opposed acoustic radiating plates are 180° out of phase. The spring volumes on the outside of the spring pistons, e.g., volume 23 on piston 15 and volume 37 on piston 17, would therefore be in compression at the same time and could be hydraulically tied to a single variable spring rate device. The spring volumes on the sides of the spring pistons away from their respective radiating plates, e.g., volume 25 on piston 15 and volume 35 on piston 17, similarly may be attached to a single variable spring rate device.

The device in FIG. 3 desirably has flexible watertight seals 39 between the acoustic radiating plates 10, 12 and the frame 41. The interior may be pressurized with an inert gas to assist in keeping surrounding water out of the device. It is intended that the radiating plates 10, 12 in the devices shown in FIGS. 2 and 3 be in contact with water only on their outer sides.

The effective force constant or spring rate of the fluid spring described herein is:

$$K = dF/dx = A^2 B/V$$

where,
 A = area of driven piston
 V = fluid volume in the spring
 B = adiabatic bulk modulus of the fluid Therefore, to increase K, the area of the piston could be increased, the fluid volume of the spring could be decreased, or the bulk modulus of the fluid increased.

The bulk modulus of a liquid is essentially constant. The use of a piston having a particular diameter sets the area. So for a spring containing only liquid, the force constant of the spring system is inversely proportional to the volume of the system.

Since the compliance of a gas is much greater than the compliance of a liquid, if the spring system were to contain a gas, the bulk modulus as well as the system volume can be varied, since for gases $$B = \delta P$$

where, for simple gases,
 $\delta = 1.4$
 P = pressure

Further, if the adiabatic gas law is used to provide an expression for the gas volume of the spring system, i.e.:

$$V = cP^{-1/\delta}$$

then $$K = 1.4/cA^2 P^{1.71}$$

Thus for a spring system containing a constant amount of gas subjected to adiabatic changes, the effective spring constant of the system varies approximately with the 1.7 power of its pressure.

The spring system may be configured so that the amount of gas within the variable spring rate device is varied either alone or in conjunction with a pressure change. The mathematical expression for the resulting overall spring rate is accordingly much more complicated.

Figure 4B:
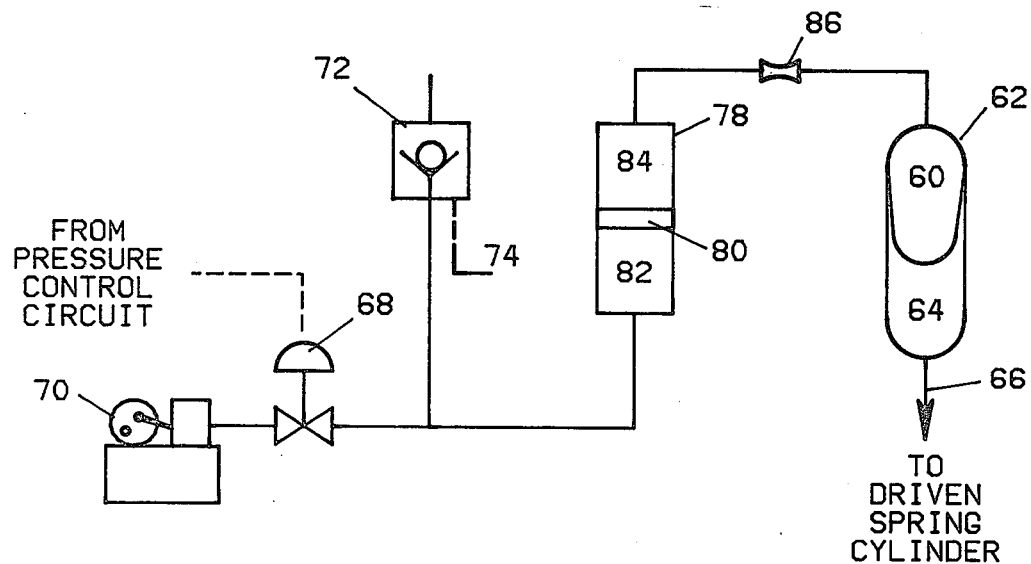
FIGS. 4A and 4B show two variations of adjustable oleo-pneumatic springs suitable for use in the invention.
Figure 4A:
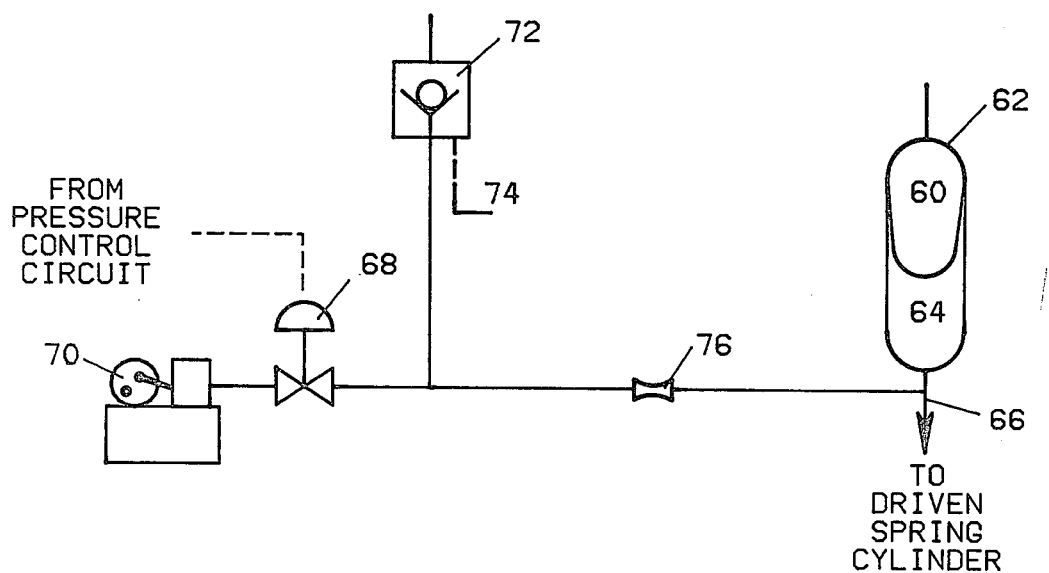
Figure 6B:
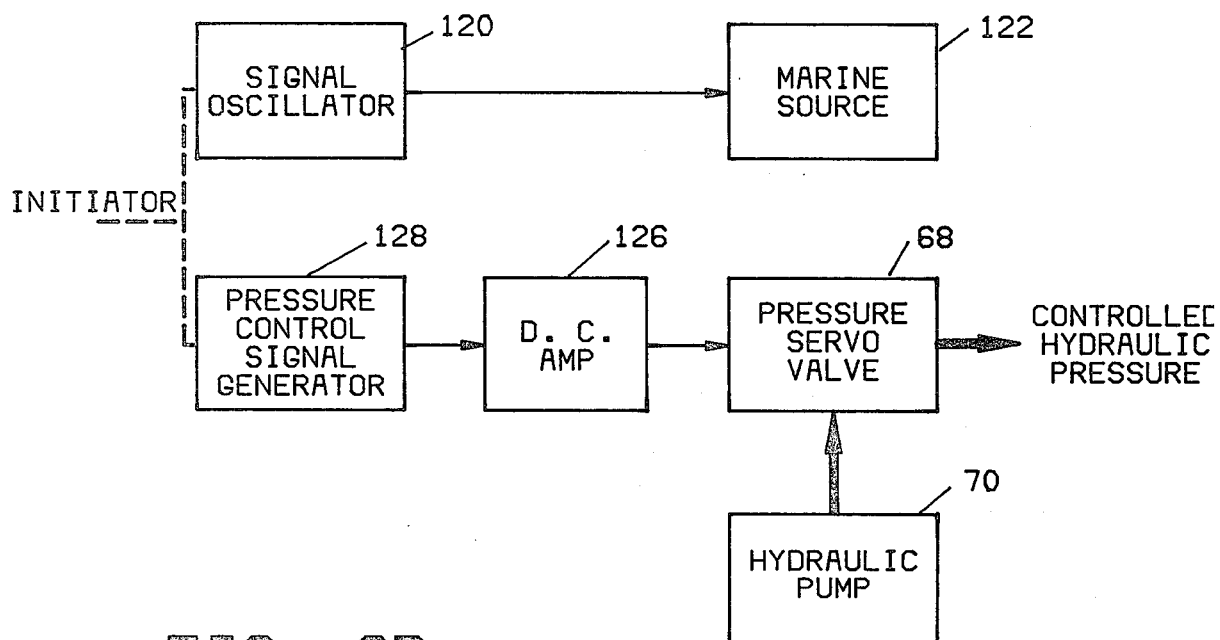
FIGS. 6A and 6B are a block diagram of the control circuit of the inventive seismic source.
Figure 6A:
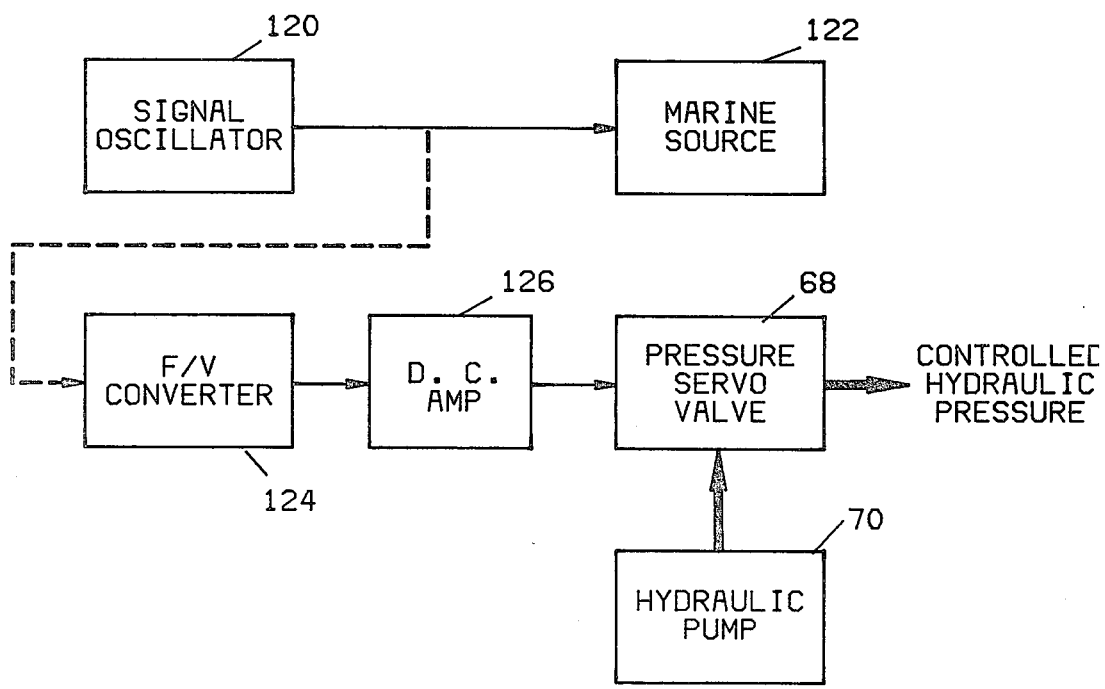

FIGS. 4A and 4B depict gas-containing variable spring-rate apparatus suitable for attachment to the ports, e.g., 50 and 52, of the driven spring cylinders. FIGS. 6A and 6B show control circuits suitable for providing a controlled hydraulic pressure to the apparatus of FIGS. 4A and 4B.

The device in FIG. 4A is a two-phase system, the spring constant of which varies approximately with the 1.7 power of the pressure of the system. A constant amount of gas 60 is maintained in an accumulator vessel 62. Some amount of liquid 64 is held in the accumulator 62. The liquid may be of any convenient type but most likely is a hydraulic fluid or an oil. The accumulator 62 is connected to a port, e.g., 50 or 52, below the liquid level of the accumulator 62 via line 66. The pressure in the accumulator 62 and the driven spring cylinder volumes is controlled and varied by a pressure servo valve 68. The pressure servo valve can be controlled by one of the circuits outlined in FIGS. 6A and 6B. A pump 70 is used to maintain a pressure on the upstream side of servo valve 68. It is also contemplated that a check valve 72, which is controlled to reduce the pressure in the system via control line 74, be included and actuated at the end of each source frequency sweep. A choke 76, having substantial dynamic liquid flow impedance, is placed between the accumulator vessel 62 and the hydraulic fluid source or pressure servo valve 68. The effective volume of the variable spring system for the featured driven spring cylinder 26 then includes: spring cylinder volume 54, the line from port 50 to accumulator vessel 62, accumulator vessel 62, and the line to choke 76 from the accumulator vessel.

It is anticipated that the compliance of the liquid in the fluid springs shown in FIGS. 4A and 4B is small compared to the compliance of the enclosed gas.

FIG. 4B illustrates another variable rate spring system which can be attached to a driven spring cylinder, e.g., 54. It includes an accumulator vessel 62 having a liquid volume 64 and gas volume 60 therein. As with the device in FIG. 4A, the liquid in accumulator vessel 62 is in communication with the liquid in one of the driven spring cylinders such as spring cylinder volume 54 via a line 66. However, in this configuration the pressurized liquid produced by hydraulic pump 70 and controlled by pressure servo valve 68 is introduced into an intermediate cylinder 78 having a free-floating piston 80 with pressurized liquid 82 on one side and a gas 84 on the other. A gas choke 86 having substantial impedance to the dynamic flow of gas is placed between the gas volumes of the intermediate cylinder 78 and the accumulator vessel 62. The choke limits the effective dynamic volume of the spring system to the sum of the volumes of the line between choke 86 and accumulator vessel 62, accumulator vessel 62, line 66, and the particular spring volume involved, e.g., 54. This configuration permits the amount of gas within the variable spring rate device to be varied along with the pressure. As in the variation in FIG. 4A, a controllable check valve 72 is desirably included in the liquid portion of the circuit so that the pressure may be reduced by a control line 74 to a predetermined value at the end of each frequency sweep.

Figure 5:
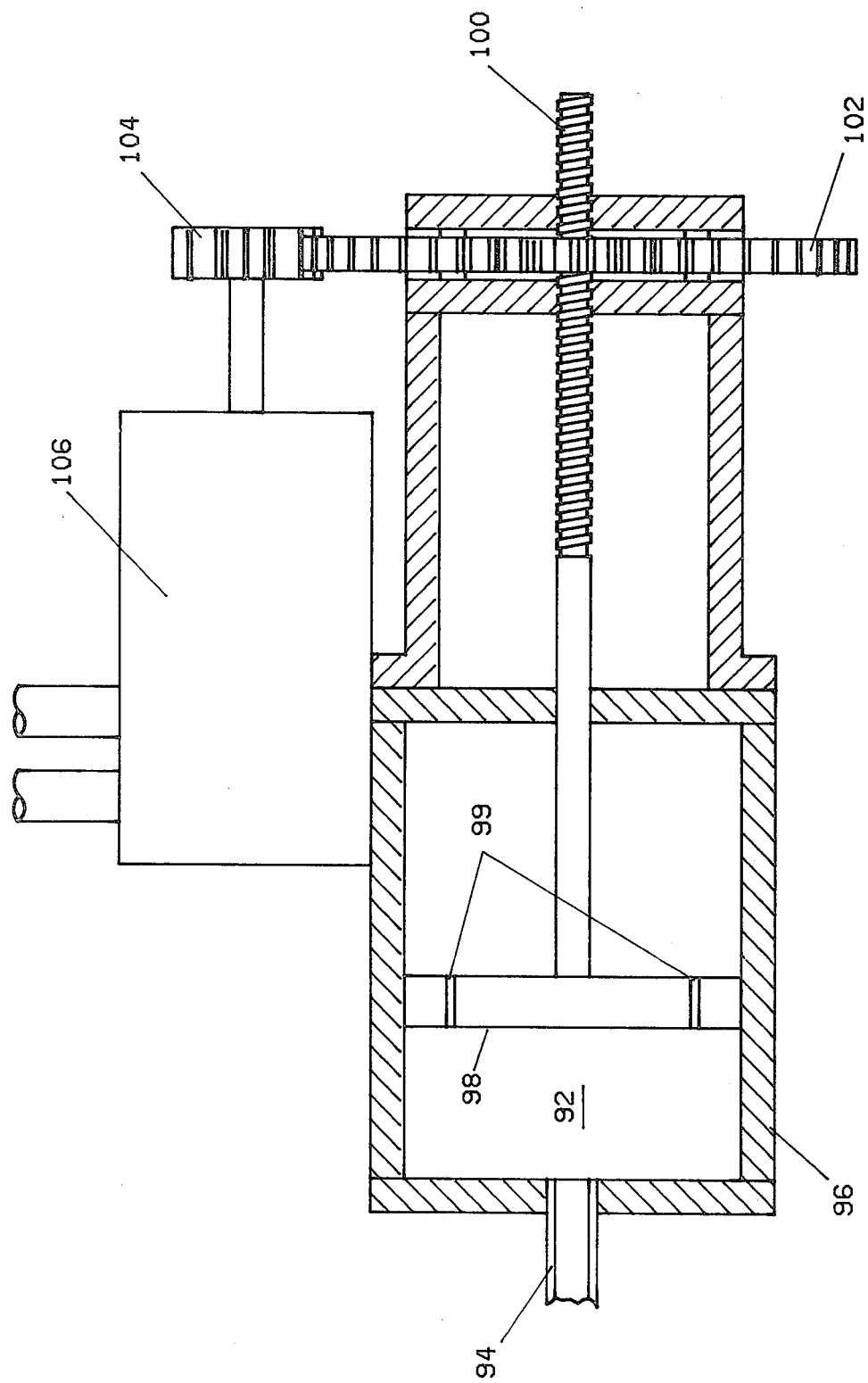
FIG. 5 shows apparatus which can be used to vary the effective oil volume of the inventive hydraulic springs.

The device in FIG. 5 is intended to be used on a completely liquid-filled spring system. As discussed above, the effective spring rate of such a system does not change appreciably with changing pressure but will vary as a function of system volume. The changing liquid volume 92 is connected to one of the spring cylinder volumes, e.g. 54 in FIG. 2, in the driven spring cylinders via a line 94. Volume 92 is defined by a cylinder 96 and a movable piston 98. The effective volume of the spring system is, therefore, volume 92, the volume of line 94, and a spring cylinder volume, e.g., 54. Piston 98 includes a sufficient number of small holes 99 which have a high impedance to dynamic liquid flow but allow liquid to pass through at a rate commensurate with the motion of piston 98.

Piston 98 is moved, and therefore the volume 92 is changed, as a function of the changing frequency by a threaded shaft 100. The threaded shaft 100 is moved by the influence of gears 102 and 104. In this variation, threaded shaft 100 does not rotate, but instead meshes with threads internal to gear 102. As gear 102 rotates, shaft 100 pulls piston 98 one way or the other in cylinder 96. Gear 102 is driven by a gear 104 directly coupled to a hydraulic motor 106. Hydraulic motor 106 is controlled in such a way as to vary volume 92 as a function of the square of the frequency emitted by the seismic source.

FIG. 6A schematically illustrates a method of producing a controlled hydraulic pressure suitable for use in the variable spring configuration shown in FIGS. 4A and 4B. Known swept signal sources utilize an electronic signal oscillator 120 to control the frequency of the marine seismic source 122. Various analog devices are used to convert the electronic signal to a pulsing hydraulic signal suitable for introduction to a drive source such as hydraulic drive cylinder 22 (in FIG. 2). The schematic pressure controller takes a signal from signal oscillator 120 applies it to frequency-to-voltage analog converter 124 to produce a voltage which is a function of the frequency. The voltage is amplified by a linear DC amplifier 126. The output of the DC amplifier 126 is used to control a pressure servo valve 68 (see also 68 in FIGS. 4A and 4B). The pressure servo valve 68 adjusts the higher pressure generated by the hydraulic pump 70 to the lower pressure needed for the spring action.

The pressure controller circuit illustrated in FIG. 6B provides a varying DC voltage to pressure servo valve 68 which is produced independently of the signal oscillator 120. Pressure control signal generator 128 produces a varying DC voltage which is initiated at the same time as the frequency sweep from signal oscillator 120 but is a function of frequency. As in the schematic of FIG. 6A, the DC voltage is amplified in DC amplifier 126 and applied to pressure servo valve 68.

Figure 7:
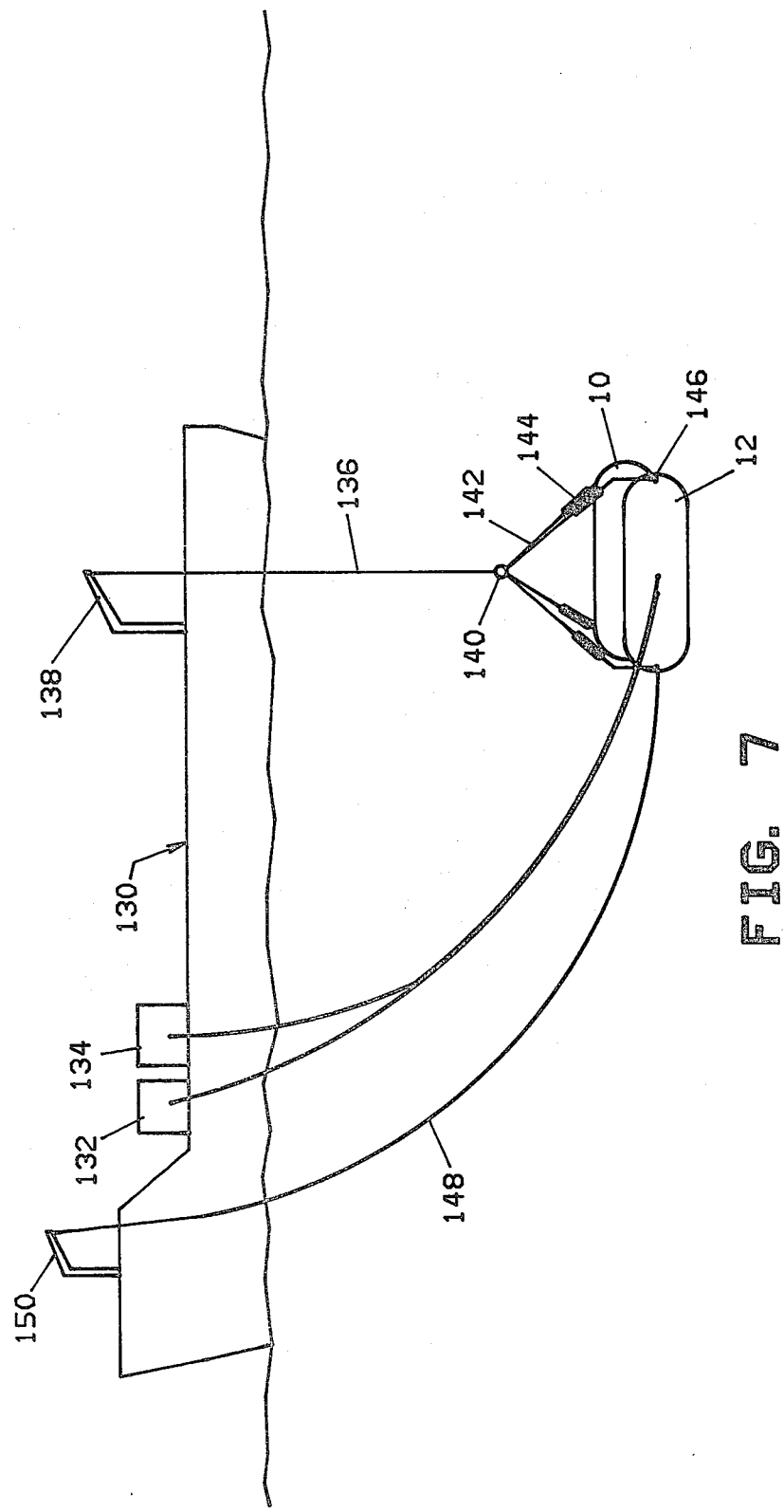
FIG. 7 depicts a deployment of the seismic source.

FIG. 7 shows a schematic view of a preferred embodiment of the inventive device in operation. The seismic source is operated from a support vessel 130 carrying auxiliary equipment such as hydraulic pump 132 and electronic control equipment 134. The seismic source is suspended at a proper depth by a lift cable 136 from vessel 130 by means of an arm 138.

The pressure waves generated by the seismic source are usually sufficiently powerful that the precaution of isolating the support vessel 130 by distance may be undertaken. In isolating the source the arm 138 may extend about twenty to thirty feet over water on one side of the vessel. Obviously, the source then operates from twenty to thirty feet off the side of the vessel. The lift cable 136 may be connected to the seismic source via connector ring 140, a number of linkages 142, and shock absorbing springs 144 to a number of eye posts 146. The eye posts 146 may be welded to the frame of the source or onto the outer surfaces of acoustic radiating plates 10 and 12 near the midpoints of the curved leading and trailing edges of acoustic radiating plates 10 and 12. The seismic source may be towed using a line 148 from a tow arm 150 extending about the same distance out over the water as does arm 138. The manner of suspension and isolation described above is merely illustrative and other equivalent means of suspension and isolation could be used within the spirit of the invention.

It should be understood that the invention is not limited to fluid springs which spring rates slavishly follow the disclosed theoretical equations. The equations provide an excellent estimate of the spring rate as a function of frequency, but innumerable variables inherent in a particular physical rendition of the invention will have some effect on the spring rate. For instance, particular lubricants used in the seismic source may exhibit non-Newtonian flow chracteristics. The internal friction of the device would be non-linearly dependent upon frequency and therefore affect the overall spring constant.

The foregoing disclosures and description of the invention are only illustrative and explanatory thereof. Various changes in the size, shape and materials of construction, as well as in the details of the illustrated construction and operation, may be made within the scope of the appended claims without departing from the spirit of the invention.

I claim:

1. A marine seismic source comprising:

dual opposed acoustic radiators, an actuator for oscillating each of said dual radiators adapted to produce a repeating acoustic signal in water having a frequency which rises with time, said actuators being mechanically connected to each said dual radiators, a spring system attached to each of said dual radiators having a spring rate that varies as a function of said frequency and comprising at least one piston and cylinder assembly, said assembly comprising two pistons and two cylinders, each of said pistons being attached to one of said dual radiators and said cylinders being liquid filled and being in hydraulic communication with means adapted for varying the effective spring rate of said spring system, whereby the output impedance of said acoustic radiator is varied with said frequency so as to substantially maximize the effective output power of said source at said frequency.

2. The device of claim 1 wherein the means adapted for varying the effective spring rate are liquid filled and incorporate a moveable piston and cylinder adapted to vary the liquid filled volume of the spring system with said frequency.

3. The device of claim 1 wherein the means adapted for varying the effective spring rate is filled with liquid and gas and includes means for varying the pressure of the spring system with said frequency.

4. The device of claim 3 wherein the means for varying the pressure of the spring system includes a valve adapted to return said pressure to a preset value at the beginning of each repeating signal.

5. The device of claim 3 wherein the means for varying the pressure of the spring system includes an accumulator vessel containing all gas within said means and which is in hydraulic communication with the liquid filled cylinder of the spring system.

6. The device of claim 3 which additionally includes an oscillator for controlling the actuator, a frequency-to-voltage converter suitable for detecting the frequency of the oscillator and converting it to a direct current voltage, an amplifier adapted to linearly amplify said direct current voltage to a higher level, and a pressure servo valve suitable for producing said varying spring system pressure.

7. The device of claim 3 which additionally includes an oscillator for controlling the actuator, a pre-set pressure control signal generator producing a direct current voltage which changes simultaneously with the frequency and can be initiated at the same time as the oscillator, and a pressure servo valve suitable for producing said varying spring system pressure.

8. A marine seismic source comprising:
dual opposed acoustic radiating plates, an actuator for oscillating each of said dual radiating plates adapted to produce a repeating acoustic signal in water, which frequency varies with time about linearly from about 10 Hz to about 20 Hz, said actuators being mechanically connected to each said plate, a spring system attached to each of said radiating plates and having a spring rate that varies as a function of said frequency and comprising at least one piston and cylinder assembly, said assembly comprising two pistons and two cylinders, each of said pistons being attached to one of said dual radiating plates and said cylinders being liquid filled and being in hydraulic communication with means adapted for varying the effective spring rate of said spring system, a frame for supporting said radiating plates, actuator, and spring system, whereby the output impedance of said acoustic radiators is varied with said frequency so as to substantially maximize the effective output power of said source at said frequency.

9. The device of claim 8 wherein the means adapted for varying the effective spring rate are liquid filled and incorporate a moveable piston and cylinder adapted to vary the liquid filled volume of the spring system with the frequency.

10. The device of claim 8 wherein the means adapted for varying the effective spring rate is filled with liquid and gas and includes means for varying the pressure of the spring system with said frequency.

11. The device of claim 10 wherein the means for varying the pressure of the spring system includes a valve adapted to reset said pressure to a pre-set value at the beginning of each repeating signal.

12. The device of claim 10 wherein the means for varying the pressure of the spring system includes an accumulator vessel containing all gas within said means and which is in hydraulic communication with the liquid filled cylinder of the spring system.

13. The device of claim 10 which additionally includes an oscillator for controlling the actuator, a frequency-to-voltage converter suitable for detecting the frequency of the oscillator and converting it to a direct current voltage, an amplifier adapted to linearly amplify said direct current voltage to a higher level, and a pressure servo valve suitable for producing said varying spring system pressure.

14. The device of claim 10 which additionally includes an oscillator for controlling the actuator, a pre-set pressure control signal generator producing a direct current voltage which changes simultaneously with the frequency and can be initiated at the same time as the oscillator, and a pressure servo valve suitable for producing said varying spring system pressure.

* * * * *